US012626682B2

(12) United States Patent
Schreibman et al.

(10) Patent No.: US 12,626,682 B2
(45) Date of Patent: May 12, 2026

(54) DIRECTIONALITY INDUCED ROBUST ACOUSTIC ECHO CANCELER ADAPTATION

(71) Applicant: GM GLOBAL TECHNOLOGY OPERATIONS LLC, Detroit, MI (US)

(72) Inventors: Amos Schreibman, Hod Hasharon (IL); Elior Hadad, Ness Tziona (IL); Gaurav Talwar, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 18/665,069

(22) Filed: May 15, 2024

(65) Prior Publication Data

US 2025/0356832 A1 Nov. 20, 2025

(51) Int. Cl.
*G10K 11/178* (2006.01)

(52) U.S. Cl.
CPC .. *G10K 11/17825* (2018.01); *G10K 11/17853* (2018.01); *G10K 11/17883* (2018.01); *G10K 2210/505* (2013.01)

(58) Field of Classification Search
CPC ....... G10K 11/17825; G10K 11/17853; G10K 11/17883; G10K 2210/505
USPC .................................... 381/71.1, 71.11, 71.4
See application file for complete search history.

(56) References Cited

U.S. PATENT DOCUMENTS 8,184,801 B1 * 5/2012 Hamalainen ............ H04M 9/08 379/406.03
2007/0274535 A1 * 11/2007 Mao ...................... H04M 9/082 381/94.1
2007/0280472 A1 * 12/2007 Stokes, III .............. H04S 7/305 379/406.01
2013/0039504 A1 * 2/2013 Pandey .................. H04R 3/005 381/71.1
2021/0098015 A1 * 4/2021 Pandey ................. H04M 9/082
2022/0310106 A1 * 9/2022 Nguyen ........... G10K 11/17854

FOREIGN PATENT DOCUMENTS

EP 2675073 B1 1/2018

OTHER PUBLICATIONS

German Office Action from counterpart DE1020241199377, dated Jan. 24, 2025.

* cited by examiner

*Primary Examiner* — William A Jerez Lora

(57) ABSTRACT

An example vehicle audio system includes a vehicle speaker configured to generate audio, multiple microphones, and a vehicle control module configured to receive an input signal via the multiple microphones, split the input signal into a parallel domain signal and an orthogonal domain signal, select a constant step size value for an orthogonal domain filter weight and a variable step size value for a parallel domain filter weight, adapt the orthogonal domain filter weight according to the orthogonal domain signal and the constant step size value, adapt the parallel domain filter weight according to the parallel domain signal and the variable step size value, combine the adapted orthogonal domain filter weight and the adapted parallel domain filter weight to define a total filter weight, and apply the total filter weight to the received input signal to perform a signal processing operation on the received input signal.

20 Claims, 5 Drawing Sheets

DIRECTIONALITY INDUCED ROBUST ACOUSTIC ECHO CANCELER ADAPTATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle audio systems, including audio signal processing using parallel and orthogonal domain filter weights.

During a phone call, a double talk scenario may occur when both a far end talker and a near end talker speak simultaneously. During a double talk event, an acoustic echo canceler in a speech processing chain may converge to a wrong solution, which may cause artifacts such as cancellation of a desired signal, musical tones, and a reverberation effect on an output of the acoustic echo canceler where the original sound is heard along with a delayed version of the same sound.

SUMMARY

An example vehicle audio system includes at least one vehicle speaker configured to generate audio in an interior of a vehicle, multiple microphones each configured to obtain audio within the interior of the vehicle, and a vehicle control module configured to receive an input signal via the multiple microphones, split the input signal received via the multiple microphones into a parallel domain signal and an orthogonal domain signal, select a constant step size value for an orthogonal domain filter weight and a variable step size value for a parallel domain filter weight, adapt the orthogonal domain filter weight according to the orthogonal domain signal and the constant step size value, adapt the parallel domain filter weight according to the parallel domain signal and the variable step size value, combine the adapted orthogonal domain filter weight and the adapted parallel domain filter weight to define a total filter weight, and apply the total filter weight to the received input signal to perform a signal processing operation on the received input signal, prior to audio output of the received input signal.

In some examples, the vehicle control module is configured to control the at least one vehicle speaker to output an audio signal based on the input signal as modified by the total filter weight.

In some examples, the vehicle control module is configured to split the input signal into the parallel domain signal and the orthogonal domain signal by applying a parallel projection to the input signal received via the multiple microphones, and applying an orthogonal projection to the input signal received via the multiple microphones.

In some examples, the vehicle control module is configured to obtain a source signal steering vector according to at least one of a beamformer parameter and a specified tuning state parameter, and calculate the parallel projection and the orthogonal projection based on the source signal steering vector.

In some examples, the parallel projection is defined parallel to a target near end audio source. In some examples, the orthogonal projection is defined orthogonal to a target near end audio source.

In some examples, the vehicle control module is configured to apply a greater variable step size value during a first time period where a double talk condition is present in the input signal, compared to a second time period where the double talk condition is present in the input signal.

In some examples, the vehicle control module is configured to execute an acoustic echo canceler (AEC) operation to determine a residual echo value, by subtracting a product of the total filter weight and a reference signal from the input signal received via the multiple microphones.

In some examples, the vehicle control module is configured to adapt the orthogonal domain filter weight and adapt the parallel domain filter weight using at least one of a normalized least mean square (NLMS), a recursive least squares (RLS) or an affine projection. In some examples, the multiple microphones are arranged in a linear array within the vehicle.

An example method of processing audio signals in a vehicle interior includes receiving, by a vehicle control module, an input signal from multiple microphones, each of the multiple microphones configured to obtain audio within an interior of a vehicle, splitting the input signal received via the multiple microphones into a parallel domain signal and an orthogonal domain signal, selecting a constant step size value for an orthogonal domain filter weight and a variable step size value for a parallel domain filter weight, adapting the orthogonal domain filter weight according to the orthogonal domain signal and the constant step size value, adapting the parallel domain filter weight according to the parallel domain signal and the variable step size value, combining the adapted orthogonal domain filter weight and the adapted parallel domain filter weight to define a total filter weight, and applying the total filter weight to the received input signal to perform a signal processing operation on the received input signal, prior to audio output of the received input signal.

In some examples, the method includes controlling at least one vehicle speaker to output an audio signal based on the input signal as modified by the total filter weight.

In some examples, splitting the input signal into the parallel domain signal and the orthogonal domain signal includes applying a parallel projection to the input signal received via the multiple microphones, and applying an orthogonal projection to the input signal received via the multiple microphones.

In some examples, the method includes obtaining a source signal steering vector according to at least one of a beamformer parameter and a specified tuning state parameter, and calculating the parallel projection and the orthogonal projection based on the source signal steering vector.

In some examples, the parallel projection is defined parallel to a target near end audio source. In some examples, the orthogonal projection is defined orthogonal to a target near end audio source.

In some examples, adapting the parallel domain filter weight includes applying a greater variable step size value during a first time period where a double talk condition is present in the input signal, compared to a second time period where the double talk condition is present in the input signal.

In some examples, the method includes executing an acoustic echo canceler (AEC) operation to determine a residual echo value, by subtracting a product of the total filter weight and a reference signal from the input signal received via the multiple microphones.

In some examples, adapting the orthogonal domain filter weight and adapting the parallel domain filter weight includes using at least one of a normalized least mean square (NLMS), a recursive least squares (RLS) or an affine projection. In some examples, the multiple microphones are arranged in a linear array within the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In some examples, a signal processing chain may include an acoustic echo canceler (AEC), such as for processing audio signals associated with a vehicle interior. During a phone call, a double talk (DT) scenario occurs when both the far end (FE) talker and the near end (NE) talker speak simultaneously. During the double talk scenario, adaptation provided by the AEC adaptive filter (AF) may be reduced or halted, to inhibit or prevent the adaptive filter from converging to a wrong solution. This could potentially lead to sub-optimal convergence, thus leading to a wrong solution that may cause artifacts such as cancellation of a desired signal, musical tones, and a reverberation effect on the output of the AEC.

In some example embodiments, knowledge of the location of the desired near end source may be used to split the AEC filter to two domains, with one domain parallel to the desired source and another domain orthogonal to the desired near end source. The orthogonal domain may be adapted with little or no limitations, even during a DT condition, because the orthogonal domain signal may not include any desired speech (e.g., due to the domain being orthogonal to the near end source). In the parallel domain, double talk detection may be simpler, relative to the original domain, due to signal to echo (SER) levels in the parallel domain being higher (e.g., because the orthogonal domain signal has been split out from the parallel domain signal).

Figure 1:
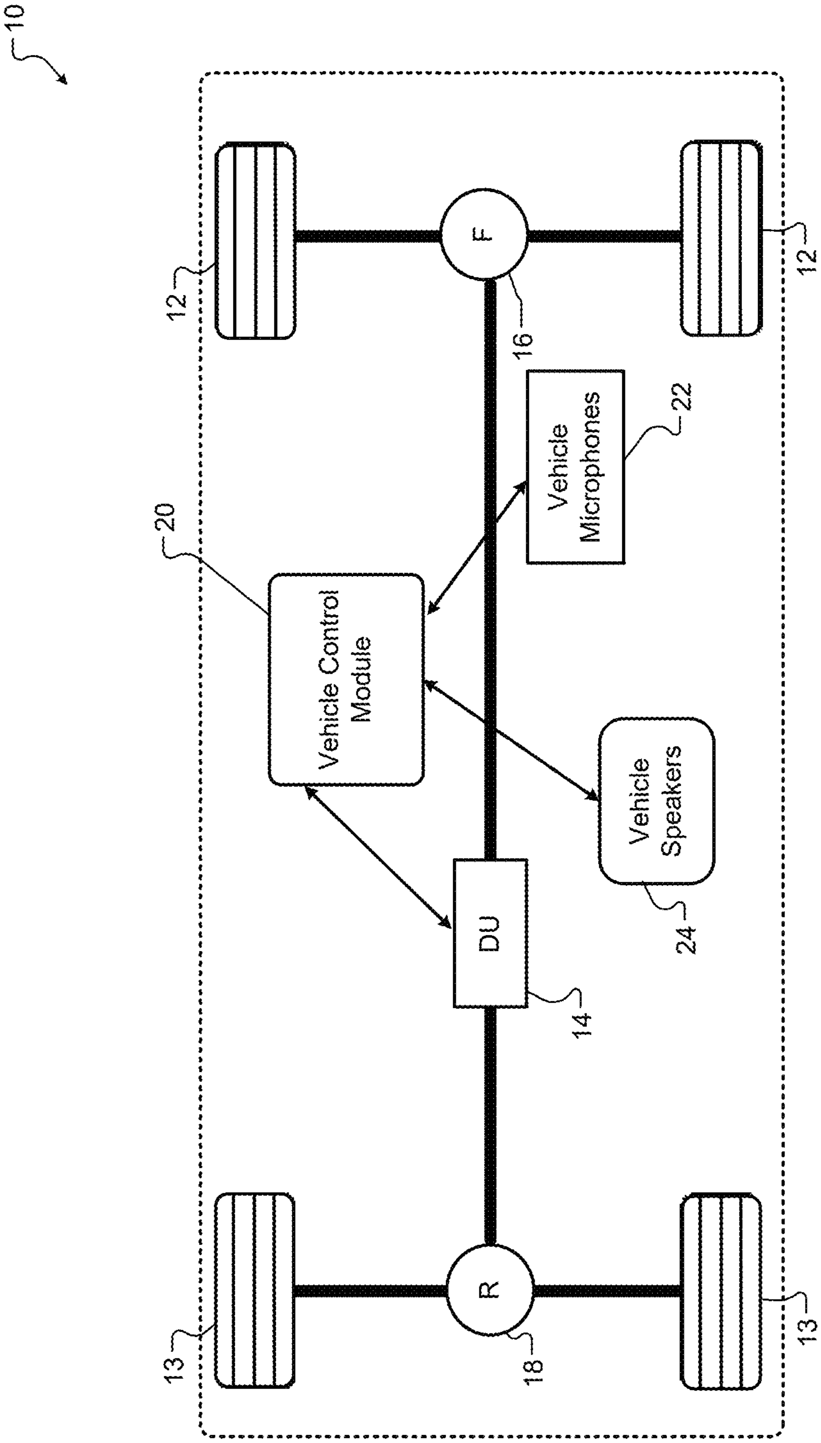
FIG. 1 is a diagram of an example vehicle including a vehicle audio system.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, steering wheel position sensors, braking sensors, location sensors such as global positioning system (GPS) antennas, wheel height and/or position sensors, accelerometers, etc.). Some sensors may be configured to monitor current motion of the vehicle, acceleration of the vehicle, braking of the vehicle, current steering direction of the vehicle, current height and/or position of one or more wheels, etc.

In some examples, a vehicle microphones 22 are configured to capture audio signals from an interior of the vehicle 10. For example, multiple microphones (e.g., at least two microphones, at least four microphones, at least eight microphones, etc.) may be arranged in the interior of the vehicle 10, one or more devices located in the interior to the vehicle 10 may include microphones, etc. The vehicle microphones 22 may be arranged in a linear array in some examples, and may include any suitable microphone structure or components suitable for capturing and transmitting audio signals (e.g., converting acoustical mechanical audio signals to an electrical signal).

The vehicle 10 includes multiple vehicle speakers 24, which may be configured to generate audio signals in the interior of the vehicle 10. For example, a passenger or driver of the vehicle may use the vehicle microphones 22 and the vehicle speakers 24 to conduct a call (such as a hands-free phone call), where the vehicle microphones 22 capture speech of the passenger or driver and the vehicle speaker 24 generate audio signals based on speech of another person on the other end of the phone call (which may be referred to as a far end (FE) signal).

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 2:
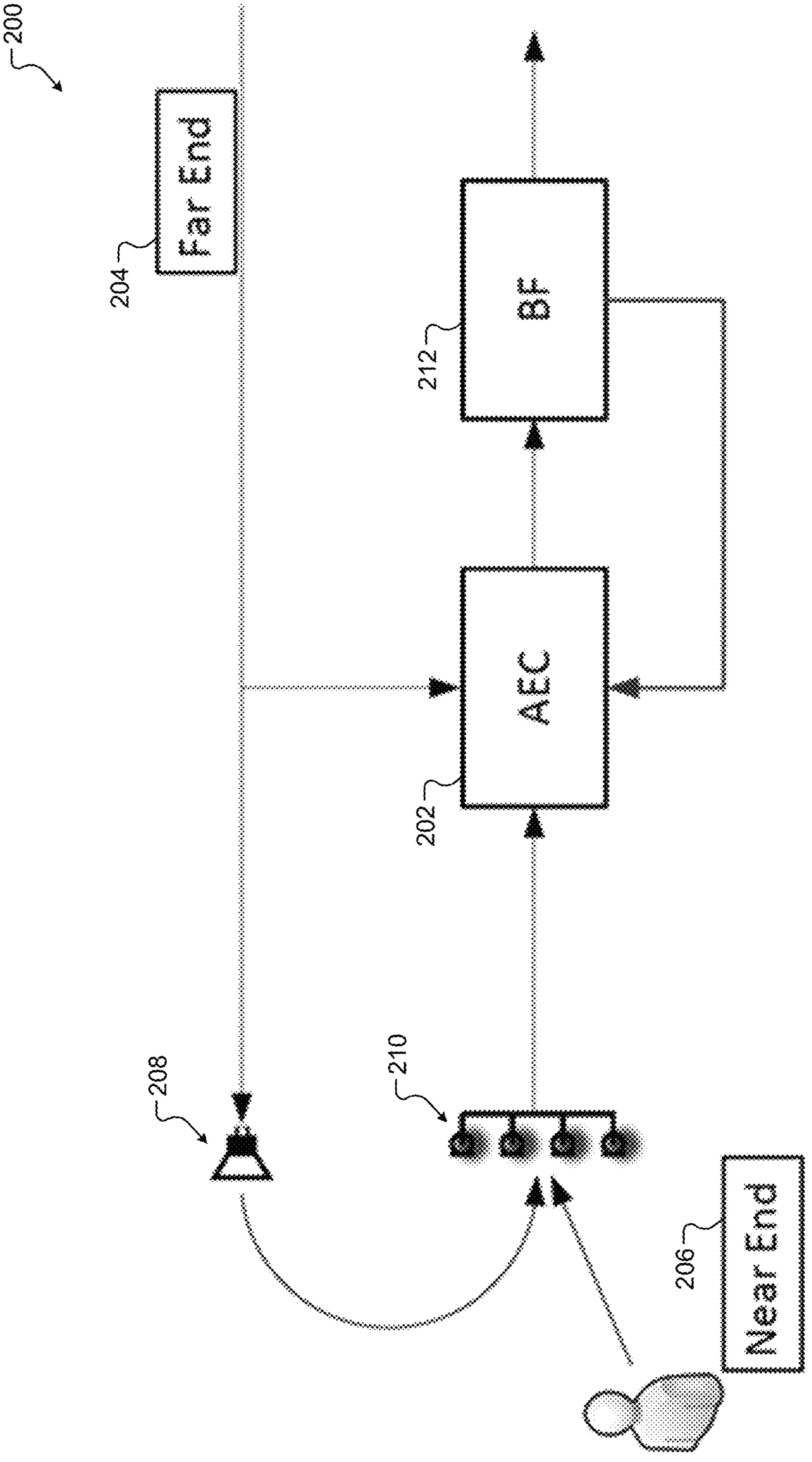
FIG. 2 is a block diagram depicting an example signal processing system including an audio echo canceler.

FIG. 2 is a block diagram depicting an example signal processing system 200 including an acoustic echo canceler 202. A call may occur between a far end audio source 204 (e.g., a speaker on another end of a phone call), and a near end audio source 206 (e.g., an occupant of a vehicle such as a driver or passenger). Although FIG. 2 is described with reference to a vehicle, other examples may be used in other non-vehicle settings.

As shown in FIG. 2, the system 200 may include a speaker 208 (such as a vehicle interior speaker) which is configured to generate an audio signal based on an input signal from the far end audio source 204. For example, speech from a far end talker may be converted by the speaker 208 from an electrical signal to an acoustic mechanical sound signal which is audible by occupants of a vehicle.

The system 200 includes multiple microphones 210. The microphones 210 may be configured to obtain audio signals from an interior of the vehicle. For example, the microphones 210 may pick up audio from the near end audio source 206, and convert acoustic mechanical sounds (e.g., vehicle occupant speech) into electrical audio signals.

The microphones 210 may include any suitable microphone components and arrangement, such as a linear array of microphones. Although FIG. 2 illustrates an array of four microphones, other embodiments may include more or less microphones (such as at least two microphones, at least eight microphones, etc.), and the microphones may be in a different arrangement with respect to one another and within the vehicle interior.

The microphones 210 may capture audio from the speaker 208, as shown in FIG. 2. For example, the microphones 210 may be primarily designed to pick up speech from the near end audio source 206 (e.g., the vehicle occupant speaker), but other sounds may also be introduced in the vehicle interior which are not intended for capture by the microphones 210.

As shown in FIG. 2, a speech processing chain may be used to at least partially remove the audio signal from the speaker 208, in the signal received by the microphones 210. The speech processing chain may include any suitable speech processing elements, such as an acoustic echo canceler 202, a beamformer 212, etc. These components may be part of a vehicle control module in some example embodiments.

Figure 3:
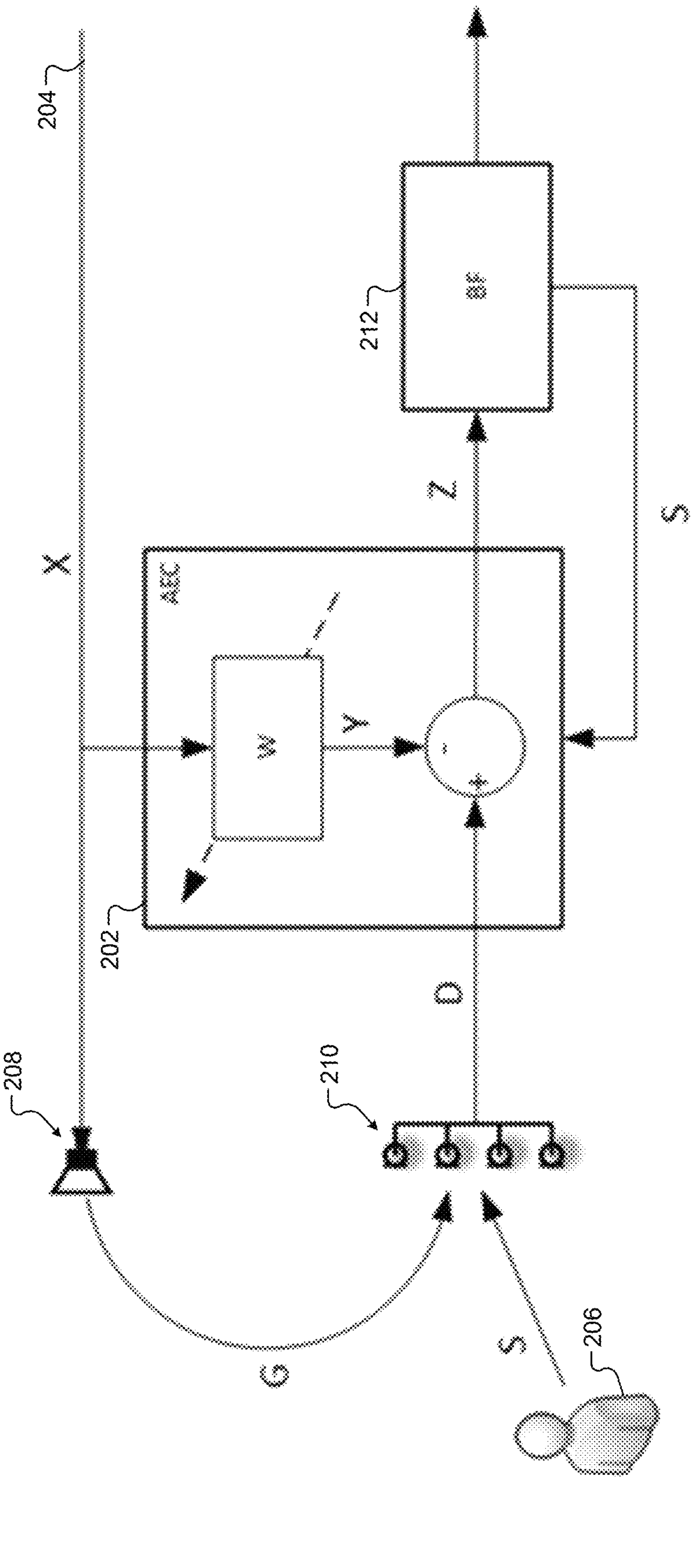
FIG. 3 is a block diagram depicting example signals in the signal processing system of FIG. 2.

FIG. 3 is a block diagram depicting example signals in the signal processing system of FIG. 2. In the example diagram of FIG. 3, Z represents an output residual echo, D is the input signal (e.g., received from the far end audio source 204), X is a reference signal and W represents adaptive filter weights. In this example, an AEC operation may be:

$$Z = D - W^H X$$

When no speech is active from the near end audio source 206, the AEC may use the following equation to adapt the adaptive filter weights W:

$$W_{opt} = \operatorname{argmin}_W E\{|Z|^2\} = R^{-1}P$$

where R is a reference auto-correlation matrix $R=E\{XX^H\}$ and P is a cross-correlation matrix $P=E\{XD^H\}$.

In some examples, and optimal adaptive filter weight $W_{opt}$ may be split into two domains, $W_{\|}$, which is parallel to the near end audio source 206, and $W_{\perp}$, which is orthogonal to the near end audio source 206. For example:

$$W_{opt} = W_{\|} + W_{\perp}$$

In order to adapt separately, parallel and orthogonal projections $T_{\|}$ and $T_{\perp}$, may be applied to the input signal D:

$$D_{\|} = T_{\|}D;\ D_{\perp} = T_{\perp}D$$

where $T_{\|}$ and $T_{\perp}$ are defined as the parallel and orthogonal projection functions. A steering vector S of the desired source may be used to construct the parallel and orthogonal projections $T_{\|}$ and $T_{\perp}$. The near end desired steering signal S may be obtained in any suitable manner, such as using available parameters of the beamformer 212, using a calculation from a pre-tuning stage, etc. An example for a single rank steering vector S parallel and orthogonal projection matrix is:

$$T_{\|} = SS^H/S^HS;\ T_{\perp} = I - T_{\|}$$

Any suitable adaptive algorithm may be used to solve for $W_{\|}$ and $W_{\perp}$, such as normalized least mean square (NLMS), recursive least squares (RLS), affine projection algorithm (APA), etc. Using NLMS as an example, an adaptive iteration step may be:

$$W(n+1) = W(n) + \mu X(n)Z^*(n)/\|X(n)\|^2$$

Where μ is the adaptive step size, also referred to as learning rate. The learning rate determines the duration of the epoch. Because the near end desired signal may not be present in $D_{\perp}$, the following example equation may be used to solve for $W_{\perp}$ with a constant adaptive step size $\mu_{\perp}$, thereby achieving fast and deep convergence:

$$W_{\perp}(n+1) = W_{\perp}(n) + \mu_{\perp}X(n)Z_{\perp}^*(n)/\|X(n)\|^2$$

Because the near end signal may exist in $D_{\|}$, a variable step size (VSS) $\mu_{\|}(n)$ may be used to solve for $W_{\|}$ to protect $W_{\|}$ from diverging:

$$W_{\|}(n+1) = W_{\|}(n) + \mu_{\|}(n)X(n)Z_{\|}^*(n)/\|X(n)\|^2$$

In some examples, higher $\mu_{||}(n)$ values may be selected or used for situations where there is no double talk present, enabling fast convergence. When there is double talk present, lower $\mu_{||}(n)$ values may be selected or used, and adjusted appropriately to avoid filter divergence. $\mu_{||}(n)$ values may be estimated in any suitable manner, such as based on X(n) energy levels, X(n) to $D_{||}(n)$ correlation, directionality of $Z_{||}(n)$, etc.

Due to the $T_{||}$ projection, the echo levels may be lower in $D_{||}$ and the SER levels higher when compared to D, thereby making $\mu_{||}(n)$ estimation easier. This may reduce the number of misdetections, achieving faster convergence and producing better speech quality. These concepts may also be used in other adaptive algorithms processes.

The adaptive algorithm, optimization criteria, rule set, etc. may be selected based on suitability with orthogonal and parallel models. For example, these options may be selected on basis of system identification methodologies. For instance, if these features qualify as auto regressive moving average (ARMA) models, a more apposite ruleset can be chosen based on system parameterization.

Referring again to FIG. 3, the element G may be an impulse response. For example, the adaptive filter weights W may be G in an optimal case. The reference signal X may represent sound playing in the speaker 208, and the system 200 may be used in an attempt to cancel out the reference signal X (e.g., aiming to eliminate the reference signal). For example, the reference signal X may be multiplied by the adaptive filter weights W, resulting in a signal Y which may then cancel the echo signal present in D.

Although the element G may be unknown, the system 200 may be configured to solve for element G. S may represent an acoustic function between the near end audio source 206 and the microphones 210, and may not include the speech itself. The acoustic function S may depend on a location of the speaker's mouth relative to the microphones 210, for example.

Figure 4:
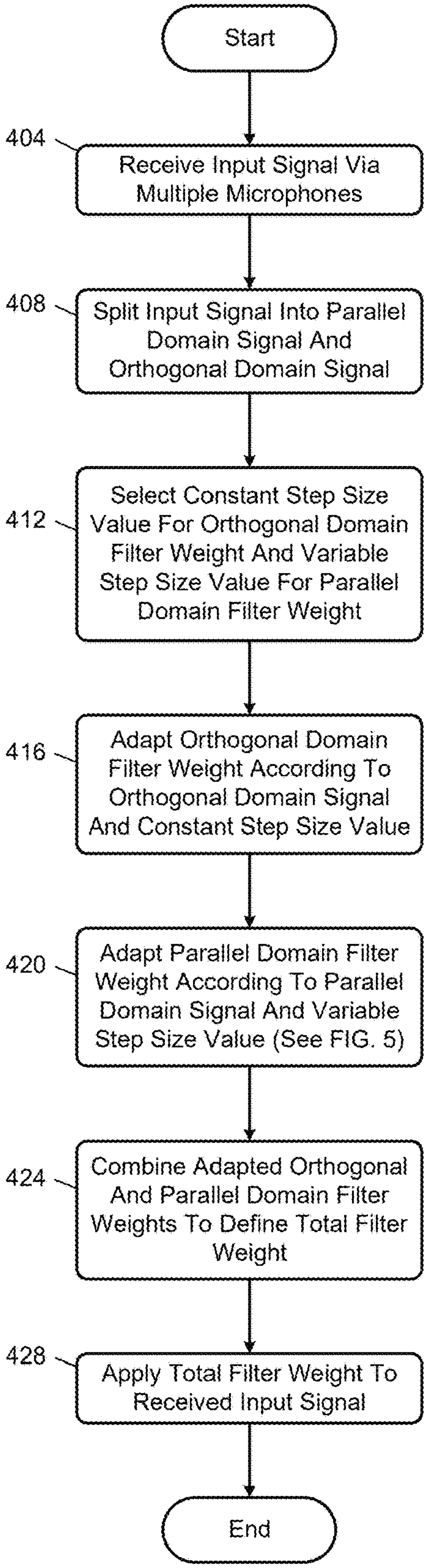
FIG. 4 is a flowchart depicting an example process for performing audio signal processing using a parallel domain signal and an orthogonal domain signal.

FIG. 4 is a flowchart depicting an example process for performing audio signal processing using a parallel domain signal and an orthogonal domain signal. The process may be performed by, for example, the vehicle control module 20 of FIG. 1. At 304, the process begins by receiving an input signal via multiple microphones, such as the vehicle microphones 22 of the vehicle 10 in FIG. 1, or the microphones 210 in FIGS. 2 and 3.

At 408, control splits the input signal into a parallel domain signal and an orthogonal domain signal. Control then selects a constant step size value for the orthogonal domain filter weight at 412, and a variable step size value for the parallel domain filter weight.

At 416, the vehicle control module is configured to adapt the orthogonal domain filter weight according to the orthogonal domain signal and the constant step size value. Example details for adapting the orthogonal domain filter weight are described above with reference to FIGS. 2 and 3.

The vehicle control module is configured to adapt the parallel domain filter weight at 420, according to the parallel domain signal and variable step size value. Further details regarding adapting the parallel domain filter weight are described above with reference to FIGS. 2 and 3, and further below with reference to the example in FIG. 5.

At 424, control is configured to combine the adapted orthogonal and parallel domain filter weights to define a total filter weight. The total filter weight is then applied to the received input signal at 428. For example, the vehicle control module may be configured to generate an output audio signal based on the received input signal, after modifying the input signal based on the adapted filter weights.

Figure 5:
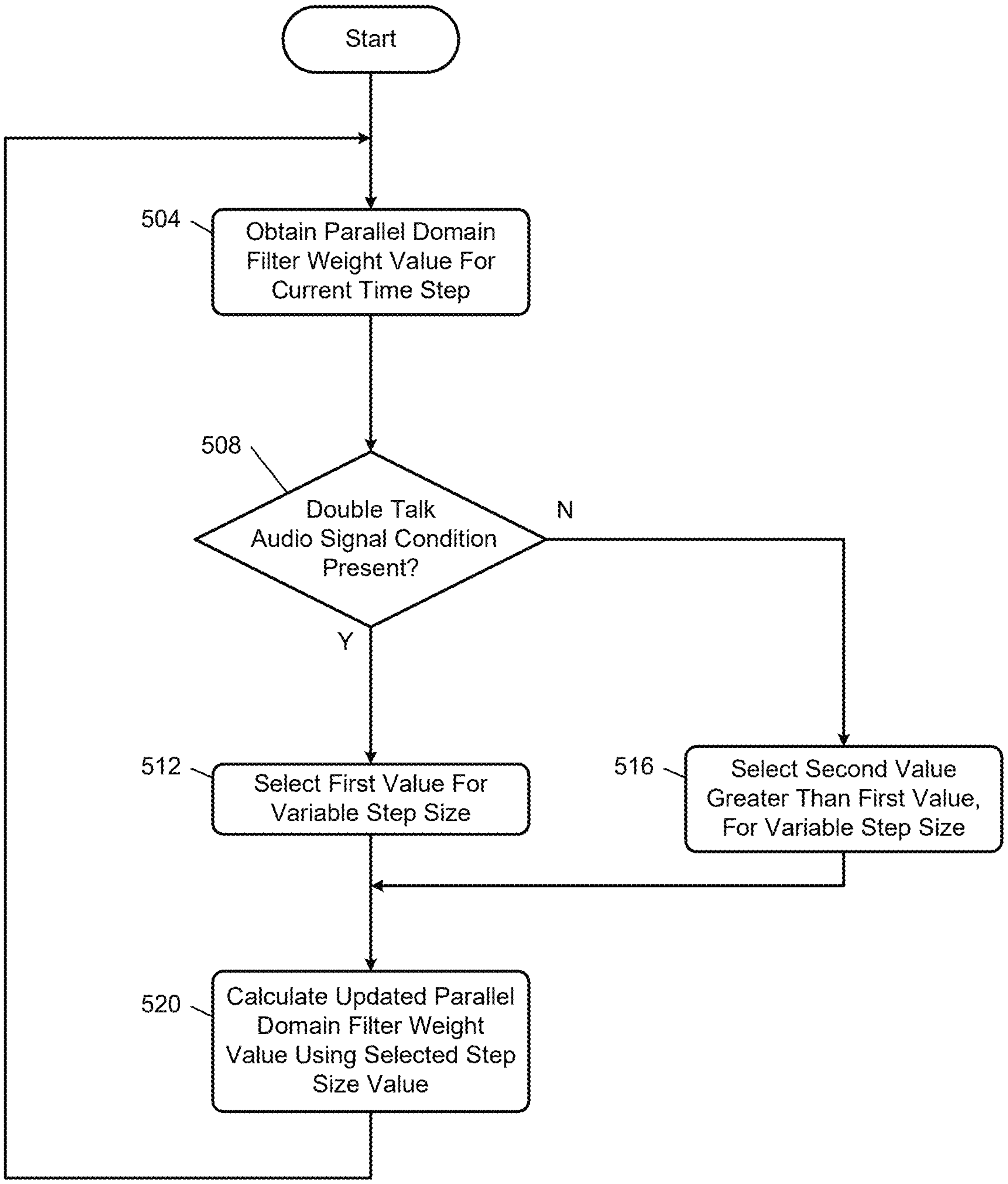
FIG. 5 is a flowchart depicting an example process for determining variable step size values for the process of FIG. 4.

FIG. 5 is a flowchart depicting an example process for determining variable step size values for the process of FIG. 4. The process may be performed by, for example, the vehicle control module 20 of FIG. 1. At 504, the process begins by obtaining the parallel domain filter weight value for a current time step (e.g., a value that is currently being used for adaptive filtering on the parallel domain signal).

Control then determines at 508 whether a double talk audio signal condition is present (such as by using any suitable sensor and/or signal processing techniques to determine or detect double talk). If the double talk condition is present at 508, control proceeds to 512 to select a first value for the variable step size.

If the double talk condition is not present at 508, control proceeds to 516 to select a second value for the variable step size, which is greater than the first value. In this manner, the vehicle control module may use smaller step sizes for adaptation when a double talk condition is present, and larger step sizes when the double talk condition is not present. At 520, control calculates an updated parallel domain filter weight value using the selected step size value.

As described above, in some examples the input signal is split into two domains (orthogonal and parallel to the desired source), and different adaptations are used in each domain. For example, in the orthogonal domain, the desired source (e.g., near end talker) may not be present, or only residuals may exist. A constant learning rate step size may be used when there is no need to halt adaptation, because the desired speaker is not present in the orthogonal signal.

In the parallel domain, the desired source may be present, but echo levels are different (e.g., when the orthogonal domain signal is removed). A variable step size may be used, where a higher value is selected when the desired speaker is not present, and a smaller (or zero) value is selected when the desired speaker is present. The desired speaker may refer to a person who is talking where the system is intended to transmit their speech, but cancel any echo. For example, the adaptive filter should ignore the desired source (e.g., person in the vehicle speaking into the microphone array), but continue filtering the echo even when the desired source is talking.

Splitting the input signal into two dimensions allows for proceeding with little regard to the desired source in the orthogonal domain (e.g., because the desired source may not be present in the orthogonal domain signal), while there should be a lower echo in the parallel domain making it easier to detect the presence of double-talk scenarios.

Although some example embodiments described herein refer to vehicle interiors and vehicle microphones and speakers, the signal processing techniques may be used in other suitable settings, such as a room or music playing on a loud speaker while trying to talk on a smartphone (e.g., where there is a desire to cancel the music while the smartphone hears the speaker's voice). In some examples, techniques described herein may modify the adaptation learning rate, while the filtering is applied to the input signals constantly or as desired. The adaptive filter may use polynomial fitting, weights that fit in a recursive equation, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle audio system comprising:

at least one vehicle speaker configured to generate audio in an interior of a vehicle;

multiple microphones each configured to obtain audio within the interior of the vehicle; and a vehicle control module configured to:

receive an input signal via the multiple microphones;

split the input signal received via the multiple microphones into a parallel domain signal and an orthogonal domain signal;

select a constant step size value for an orthogonal domain filter weight and a variable step size value for a parallel domain filter weight;

adapt the orthogonal domain filter weight according to the orthogonal domain signal and the constant step size value;

adapt the parallel domain filter weight according to the parallel domain signal and the variable step size value;

combine the adapted orthogonal domain filter weight and the adapted parallel domain filter weight to define a total filter weight; and apply the total filter weight to the received input signal to perform a signal processing operation on the received input signal, prior to audio output of the received input signal.

2. The vehicle audio system of claim 1, wherein the vehicle control module is configured to control the at least one vehicle speaker to output an audio signal based on the input signal as modified by the total filter weight.

3. The vehicle audio system of claim 1, wherein the vehicle control module is configured to split the input signal into the parallel domain signal and the orthogonal domain signal by:

applying a parallel projection to the input signal received via the multiple microphones; and applying an orthogonal projection to the input signal received via the multiple microphones.

4. The vehicle audio system of claim 3, wherein the vehicle control module is configured to:

obtain a source signal steering vector according to at least one of a beamformer parameter and a specified tuning state parameter; and calculate the parallel projection and the orthogonal projection based on the source signal steering vector.

5. The vehicle audio system of claim 3, wherein the parallel projection is defined parallel to a target near end audio source.

6. The vehicle audio system of claim 3, wherein the orthogonal projection is defined orthogonal to a target near end audio source.

7. The vehicle audio system of claim 1, wherein the vehicle control module is configured to apply a greater variable step size value during a first time period where a double talk condition is present in the input signal, compared to a second time period where the double talk condition is present in the input signal.

8. The vehicle audio system of claim 1, wherein the vehicle control module is configured to execute an acoustic echo canceler (AEC) operation to determine a residual echo value, by subtracting a product of the total filter weight and a reference signal from the input signal received via the multiple microphones.

9. The vehicle audio system of claim 1, wherein the vehicle control module is configured to adapt the orthogonal domain filter weight and adapt the parallel domain filter weight using at least one of a normalized least mean square (NLMS), a recursive least squares (RLS) or an affine projection.

10. The vehicle audio system of claim 1, wherein the multiple microphones are arranged in a linear array within the vehicle.

11. A method of processing audio signals in a vehicle interior, the method comprising:

receiving, by a vehicle control module, an input signal from multiple microphones, each of the multiple microphones configured to obtain audio within an interior of a vehicle;

splitting the input signal received via the multiple microphones into a parallel domain signal and an orthogonal domain signal;

selecting a constant step size value for an orthogonal domain filter weight and a variable step size value for a parallel domain filter weight;

adapting the orthogonal domain filter weight according to the orthogonal domain signal and the constant step size value;

adapting the parallel domain filter weight according to the parallel domain signal and the variable step size value;

combining the adapted orthogonal domain filter weight and the adapted parallel domain filter weight to define a total filter weight; and applying the total filter weight to the received input signal to perform a signal processing operation on the received input signal, prior to audio output of the received input signal.

12. The method of claim 11, further comprising controlling at least one vehicle speaker to output an audio signal based on the input signal as modified by the total filter weight.

13. The method of claim 11, wherein splitting the input signal into the parallel domain signal and the orthogonal domain signal includes:

applying a parallel projection to the input signal received via the multiple microphones; and applying an orthogonal projection to the input signal received via the multiple microphones.

14. The method of claim 13, further comprising:

obtaining a source signal steering vector according to at least one of a beamformer parameter and a specified tuning state parameter; and calculating the parallel projection and the orthogonal projection based on the source signal steering vector.

15. The method of claim 13, wherein the parallel projection is defined parallel to a target near end audio source.

16. The method of claim 13, wherein the orthogonal projection is defined orthogonal to a target near end audio source.

17. The method of claim 11, wherein adapting the parallel domain filter weight includes applying a greater variable step size value during a first time period where a double talk condition is present in the input signal, compared to a second time period where the double talk condition is present in the input signal.

18. The method of claim 11, further comprising executing an acoustic echo canceler (AEC) operation to determine a residual echo value, by subtracting a product of the total filter weight and a reference signal from the input signal received via the multiple microphones.

19. The method of claim 11, wherein adapting the orthogonal domain filter weight and adapting the parallel domain filter weight includes using at least one of a normalized least mean square (NLMS), a recursive least squares (RLS) or an affine projection.

20. The method of claim 11, wherein the multiple microphones are arranged in a linear array within the vehicle.

* * * * *